(No Model.)  
2 Sheets—Sheet 1.
G. P. A. GUNTHER.
FISH TANK OR AQUARIUM.
No. 475,082.                                 Patented May 17, 1892.
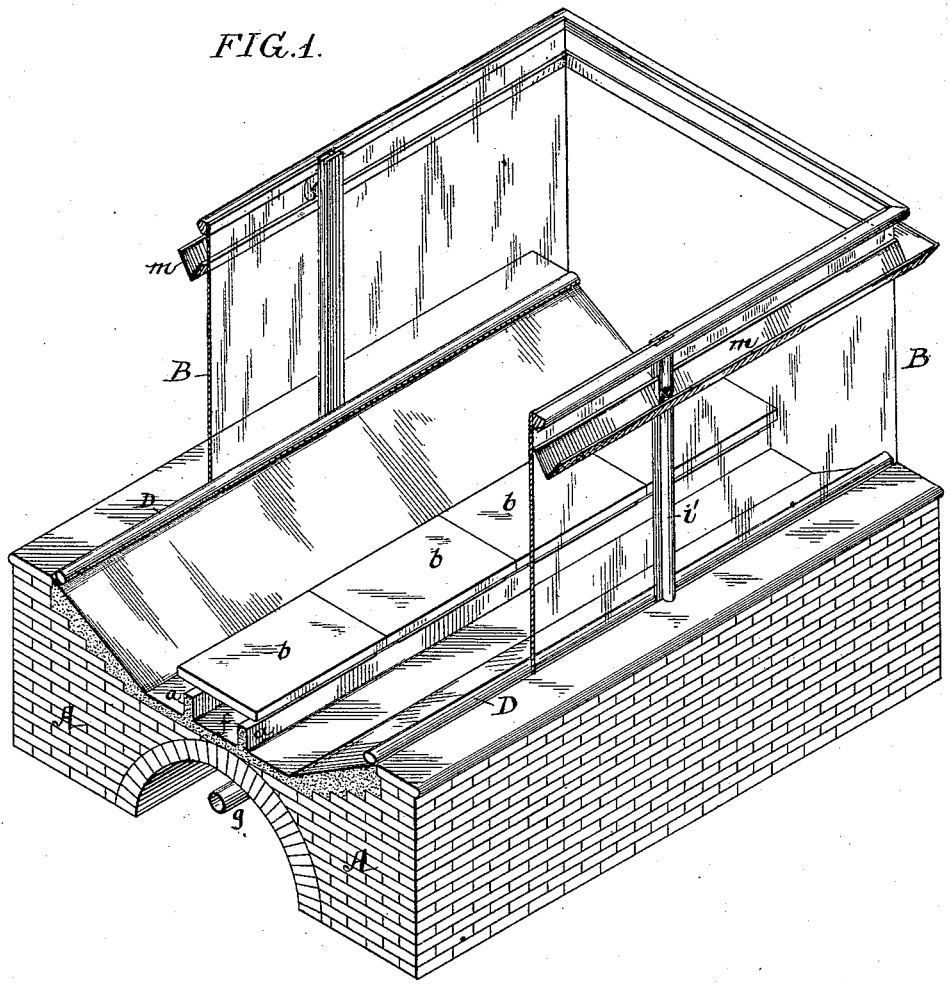
FIG. 4.
Witnesses:  
A. V. Groupe  
Fred H. Goodwin
Inventor:  
George P. A. Gunther  
by his Attorneys  
Howson & Howson (No Model.) 2 Sheets—Sheet 2.

G. P. A. GUNTHER.
FISH TANK OR AQUARIUM.

No. 475,082. Patented May 17, 1892.

Witnesses:
A. V. Groupe
Fred W. Goodwin

Inventor:
George P. A. Gunther
by his Attorneys
Howson & Howson

UNITED STATES PATENT OFFICE.

GEORGE P. A. GUNTHER, OF NEW YORK, N. Y.

FISH-TANK OR AQUARIUM.

SPECIFICATION forming part of Letters Patent No. 475,082, dated May 17, 1892.

Application filed December 14, 1891. Serial No. 414,981. (No model.)

*To all whom it may concern:*

Be it known that I, GEORGE P. A. GUNTHER, a citizen of the United States, and a resident of New York city, New York, have invented certain Improvements in Fish-Tanks or Aquariums, of which the following is a specification.

The object of my invention is to provide simple and efficient means for keeping the bottom or bed of an aquarium free from the fish slime or sediment which usually accumulates thereon, and this object I attain by providing such a flow or current of water at and near the bottom of the tank as will continuously and forcibly carry off any such sedimentary matter to appropriate outlets.

Figure 2:
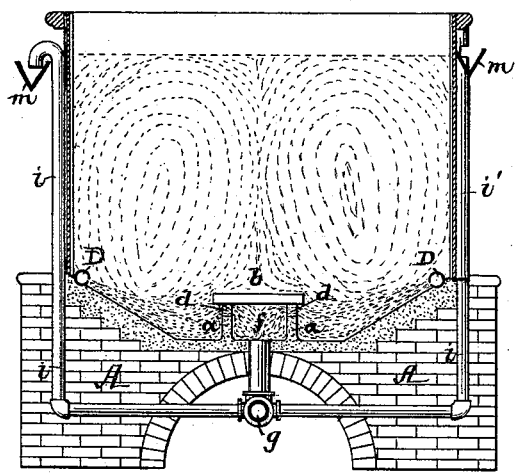
Figure 3:
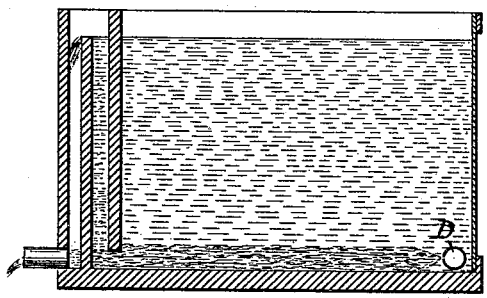

In the accompanying drawings, Figure 1 is a sectional perspective view of a portion of an aquarium constructed in accordance with my invention. Fig. 2 is a transverse section of the same. Fig. 3 is a sectional view of a modified form of aquarium, illustrating the application of my invention thereto; and Fig. 4 is an enlarged section of part of the aquarium shown in Figs. 1 and 2.

In Figs. 1 and 2, A represents the foundation of the aquarium, and B the containing structure mounted thereon and having its walls composed of sheets or plates of glass suitably connected together, the bottom of the tank having sloping sides and a narrow flat bottom, from which near the center rise two low ribs or flanges $a$, which, in connection with tiles or slabs $b$ resting on supporting-blocks $d$ raised above the tops of these ribs, form a central discharge-passage $f$, communicating with a discharge-pipe $g$, extending through an arched vault formed in the foundation.

Along each side of the tank, close to the bottom of the glazed walls of the same, extends a pipe D, which is perforated on its inner side, so that water under pressure admitted to the pipe is discharged downwardly along the sloping bottom of the tank and toward the inlets into the discharge-passage $f$, so as to wash the fish slime or sediment into said passage and prevent it from accumulating on the bottom of the tank.

To provide for the withdrawal of the deposits from the discharge-passage $f$, there should be a steady and continuous flow of water therefrom, which may be effected by means of a valve at the discharge end of the pipe $g$, but which I prefer to effect by connecting said pipe to one or more branch pipes $i$ extending up to the desired level of water in the tank, so as to serve as overflow-pipes, and thus provide for a steady and continuous discharge of water from the passage $f$ in accordance with the volume of fresh water introduced into the tank.

The pipes D may serve as the sole means for supplying the fresh water, or there may, if desired, be an additional supply discharged into the top of the tank, the main purpose of the pipes D in this case being to act as a cleansing device.

I preferably arrange the overflow-pipes $i$ at the sutures of the glass plates, forming the sides of the tank, the overflow-pipe either running outside of the grooved bar to which the glass plates are secured, as shown at the left hand side of Fig. 2, or said bar being hollow, as shown in Fig. 4, so as to itself constitute an overflow-pipe, as shown at $i'$, at the right-hand side of Fig. 2, the pipe in either case communicating with a discharge trough, pipe, or passage $m$ at its upper end, so as to freely carry off the overflow-water from the tank.

In Fig. 3 I have illustrated my invention as applied to a tank having a flat bottom and an overflow-passage at the rear, the jets from the pipe D in this case being directed along the bottom of the tank and toward the inlet into said overflow-passage.

Having thus described my invention, I claim and desire to secure by Letters Patent—

1. A fish-tank or aquarium having a discharge-passage, with inlet-opening at or near the bottom of the tank, and a perforated pipe located near one of the walls of the tank and having its perforations so located as to direct jets of water across the bottom of the tank and toward the inlet-opening of the discharge-passage, substantially as specified.

2. A fish-tank or aquarium having glazed sides, a discharge-passage with inlet-openings at or near the bottom of the tank, and a series of overflow-pipes communicating with said discharge-passage and rising adjacent to the sides of the tank, substantially as specified.

3. A fish-tank or aquarium having glazed sides, a discharge-passage with inlet-openings at or near the bottom of the tank, and overflow-pipes communicating with said discharge-passage, and located within the suture-bars between the plates of glass forming the walls of the aquarium, substantially as specified.

In testimony whereof I have signed my name to this specification in the presence of two subscribing witnesses.

GEO. P. A. GUNTHER.

Witnesses:
EUGENE ELTERICH,
HARRY SMITH.